(12) United States Patent
Heinemann et al.

(10) Patent No.: US 10,662,678 B2
(45) Date of Patent: May 26, 2020

(54) HOLDER FOR A TWO-WHEELER LOCK (71) Applicant: ABUS August Bremicker Söhne KG, Wetter-Volmarstein (DE)

(72) Inventors: Stefan Heinemann, Wetter (DE); Andreas Kipping, Brunken (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 0 days.

(21) Appl. No.: 16/001,667

(22) Filed: Jun. 6, 2018

(65) Prior Publication Data
US 2018/0354573 A1 Dec. 13, 2018

(30) Foreign Application Priority Data

Jun. 9, 2017 (DE) .................. 20 2017 103 486 U (51) Int. Cl.
*E05B 71/00* (2006.01)
*B62H 5/00* (2006.01)
*E05B 67/38* (2006.01)
*B62J 11/00* (2020.01)

(52) U.S. Cl.
CPC .............. *E05B 71/00* (2013.01); *B62H 5/00* (2013.01); *B62H 5/003* (2013.01); *B62J 11/00* (2013.01); *E05B 2067/386* (2013.01)

(58) Field of Classification Search
CPC .. E05B 67/38; E05B 67/383; E05B 2067/386; E05B 71/00; B62H 5/00; B62H 5/001; B62H 5/003
See application file for complete search history.

(56) References Cited

U.S. PATENT DOCUMENTS

| 5,018,374 | A | * | 5/1991 | Montano | ................. E05B 71/00 70/233 |
| 5,172,093 | A | | 12/1992 | Nose et al. | |
| 5,653,365 | A | * | 8/1997 | Lee | .......................... B62H 5/00 224/445 |
| 6,321,961 | B1 | * | 11/2001 | McDaid | ................... B62J 11/00 224/425 |

(Continued)

FOREIGN PATENT DOCUMENTS

| CN | 203753285 U | 8/2014 |
| CN | 204452673 U | 7/2015 |

(Continued)

*Primary Examiner* — Christopher J Boswell
(74) *Attorney, Agent, or Firm* — Dinsmore & Shohl LLP; Cesare Sclafani (57) ABSTRACT

A holder, for a two-wheeler lock, includes a carrier that bounds a reception region for receiving the two-wheeler lock and a fixing element supported at the carrier and movable between an open position and a closed position for fixing the two-wheeler lock in the reception region. A support element is provided at the carrier that projects from the carrier along a transverse axis aligned transversely to the longitudinal axis of the carrier and is configured to engage into a cut-out of the two-wheeler lock. The support element is the only element of the holder that supports the two-wheeler lock received in the reception region against a movement along the longitudinal axis of the carrier in the open position of the fixing element, with the fixing element blocks the two-wheeler lock against a removal from the support element along the transverse axis in the closed position.

21 Claims, 5 Drawing Sheets

(56) References Cited

U.S. PATENT DOCUMENTS

| | | | |
|---|---|---|---|
| 6,820,448 B1 * | 11/2004 | Hsieh | E05B 67/003 |
| | | | 70/18 |
| 9,217,265 B2 * | 12/2015 | Muller | E05B 71/00 |
| 9,701,354 B2 * | 7/2017 | Cheng | B62J 11/00 |
| 9,909,343 B2 * | 3/2018 | Kuo | B62J 11/00 |
| 10,053,890 B2 | 8/2018 | Hommel | |
| 2013/0257616 A1 | 10/2013 | Taylor et al. | |
| 2013/0321163 A1 | 12/2013 | Brenner | |
| 2014/0042201 A1 * | 2/2014 | Weiershausen | B62H 5/00 |
| | | | 224/414 |
| 2016/0215527 A1 | 7/2016 | Steinkamp | |
| 2017/0267305 A1 * | 9/2017 | Muller | B62H 5/00 |

FOREIGN PATENT DOCUMENTS

| | | |
|---|---|---|
| CN | 205075933 U | 3/2016 |
| DE | 4313850 A1 | 11/1994 |
| DE | 202005013390 U1 | 12/2006 |
| DE | 102005043927 A1 | 3/2007 |
| DE | 202007011170 U1 | 12/2007 |
| DE | 102005040066 B4 | 6/2009 |
| DE | 102011012163 A1 | 8/2012 |
| DE | 102013102009 A1 | 9/2013 |
| DE | 202014103690 U1 | 10/2014 |
| EP | 2469491 A1 | 6/2012 |
| EP | 2987710 A2 | 2/2016 |
| EP | 3106376 A1 | 12/2016 |
| WO | 2013187991 A2 | 12/2013 |

* cited by examiner

HOLDER FOR A TWO-WHEELER LOCK

CROSS-REFERENCE TO RELATED APPLICATIONS

This application claims priority to German Utility Model No. DE 202017103486.0 filed on Jun. 9, 2017, the entire contents of which are incorporated herein by reference.

TECHNICAL FIELD

The present disclosure relates to a holder for a two-wheeler lock of the type of a folding lock, comprising a carrier that extends along a longitudinal axis and has a fastener that fastens the carrier to a tube section of a two-wheeler, wherein the carrier bounds a reception region for receiving the two-wheeler lock, and further comprising a fixing element supported at the carrier and movable between an open position and a closed position for fixing the two-wheeler lock in the reception region, and wherein a support element is provided at the carrier that supports the two-wheeler lock received in the reception region against a movement along the longitudinal axis of the carrier. may

BACKGROUND

Folding locks serve, for example, for the securing of a two-wheeler to a bicycle stand, to a lamppost or the like. For this purpose, the folding lock comprises a lock body and a jointed bar hoop which is fastened thereto and which has a plurality of jointed bars which are pivotably connected to one another and which may be folded together to form an axially parallel arrangement. The jointed bars are folded apart for the use of the folding lock to form an open loop that may, for example, engage around a frame section of the two-wheeler and the bicycle stand, lamppost or the like. To secure the two-wheeler against unauthorized use, the loop is then closed and a free end of the loop or of the jointed bar hoop is latched to the lock body.

The jointed bars may be folded together after an unlatching of the folding lock to form a compact arrangement (a so-called yardstick configuration) for the transport of the folding lock by the authorized user during the trip with the two-wheeler. The folding lock may be received in the holder in this configuration. Such holders are typically fastened to a tube section of the frame, of the bicycle luggage carrier or of the seat tube of the two-wheeler.

An exemplary folding lock is known from DE 10 2005 040 066 B4. DE 20 2005 013 390 U1 describes a bag for a folding lock.

Provided that the holder is equipped with a movable fixing element, the movable fixing element only has to be moved into the closed position to fix the two-wheeler lock in the reception region of the holder.

The holder may furthermore have a support element that supports the two-wheeler lock received in the reception region against a movement in the longitudinal direction. Such a support element may be formed, for example, by the bottom of a bag or by a support shell.

However, it may be difficult in dependence on the geometry of the frame of the two-wheeler to introduce the two-wheeler lock along its longitudinal axis into a bag or obliquely into a support shell, for example because a top tube extending above the holder restricts the introduction path.

It is furthermore a disadvantage of common holders having a bag or a support shell that the length of the two-wheeler lock that is received is limited by the bottom of the bag or of the support shell. It is desirable in this respect that a holder is universally usable for a plurality of different types or sizes two-wheeler locks.

It is also disadvantageous if the two-wheeler lock received in the holder causes unwanted rattling noises, for instance due to a lateral clearance due to production tolerances, during the trip with the two-wheeler due to the vibrations that occur here.

SUMMARY

It is an object of the present disclosure to provide a holder for a two-wheeler lock of the type of a folding lock that eliminates the aforesaid disadvantages and is in particular simple to handle and universally usable.

This object is satisfied by a holder having the features disclosed in the following description and the Figures.

In some embodiments, the holder includes a carrier, a fixing element, and a support element. The carrier extends along a longitudinal axis and includes a fastener that fastens the carrier to a tube section of a two-wheeler. The carrier bounds a reception region that receives the two-wheeler lock. The fixing element is supported at the carrier and movable between an open position and a closed position that fixes the two-wheeler lock in the reception region. The support element is provided at the carrier and supports the two-wheeler lock received in the reception region against a movement along the longitudinal axis of the carrier. The support element projects from the carrier along a transverse axis aligned transversely to the longitudinal axis and is configured to engage into a cut-out of the two-wheeler lock. The support element is the only element of the holder that supports the two-wheeler lock received in the reception region against a movement along the longitudinal axis of the carrier in the open position of the fixing element. The fixing element is configured to block the two-wheeler lock against a removal from the support element along the transverse axis in the closed position.

In this holder for a two-wheeler lock of the type of a folding lock, the typically elongate two-wheeler lock is accordingly first fixed to the carrier along its complete length with the help of a support element. The support element may be provided at an upper region of the carrier. The support element extends, starting from the carrier, along a transverse axis aligned transversely to the longitudinal axis and may thus in particular form a projection of the carrier. When the fixing element is in the open position, the support element is freely accessible along the transverse axis and the support element forms the only element that holds the two-wheeler lock within the reception region of the holder along the longitudinal axis of the carrier, in particular with respect to two mutually opposite directions along the longitudinal axis (e.g. upward and downward support). For the axial fixing of the two-wheeler lock, the support element engages into a cut-out, for example in the upper region of the two-wheeler lock (with a folded jointed bar hoop). The cut-out may in particular be an intermediate space between the lock body and a jointed bar hoop of the two-wheeler lock. The two-wheeler lock may thus be suspended at the support element, in particular frontally, i.e. at a front side of the carrier.

The two-wheeler lock may then be secured and hereby finally fixed against a removal from the support element along the transverse axis by a movement of the fixing element into the closed position. In the closed position, the fixing element therefore prevents the support element from unintentionally moving out of engagement with the cut-out of the two-wheeler lock again, with the fixing element in particular being able to engage peripherally around the folding lock. The support element may also at least substantially be the only element of the holder that supports the two-wheeler lock received in the reception region against a movement along the longitudinal axis of the carrier in the closed position of the fixing element apart from a certain force transmitting connection or friction locking due to the peripheral engagement by the fixing element.

A simple handling of the holder hereby results since in a first step the two-wheeler lock may be easily placed onto the support element or may be suspended at the support element in the open position of the fixing element and the fixing element then only has to be brought into the closed position in a second step. The fact is made use of here for the provisional fastening of the two-wheeler lock to the support element that with a folded together jointed bar hoop (yardstick configuration), a quasi-stable structure is typically formed by the friction between the adjacent jointed bars, i.e. the jointed bar hoop remains in the folded together state so that the two-wheeler lock may be easily suspended at the support element. A one-handed operation is also possible both for the suspension and for the closing of the fixing element. A particularly simple handling in particular results here when the fixing element has a pivotable fixing hoop and/or when a free end of the fixing element is blockable, i.e. may be fixed in position, such as will be explained in the following, at the carrier by a latch to maintain the closed position of the fixing element.

Since the support element projects from the carrier along the transverse axis and engages into a cut-out of the two-wheeler lock along the transverse axis, the two-wheeler lock may at least substantially be placed frontally onto the carrier without this introduction of the two-wheeler lock into the reception region of the holder being hindered by frame sections of the two-wheeler in the environment of the holder.

Since furthermore the support element engaging into the cut-out of the two-wheeler lock is the only element that secures the two-wheeler lock against a movement along the longitudinal axis of the carrier in the open position of the fixing element, no support of the two-wheeler lock at a longitudinal end of the two-wheeler lock takes place and the use of the holder is not restricted to a single length of a matching two-wheeler lock. The reception region for the two-wheeler lock may in particular be open, apart from the support element, at both sides of the fixing element in alignment with the longitudinal axis of the carrier, i.e. viewed along the longitudinal axis, no further bounding of the reception region is provided. The holder is thus universally usable for different lengths of two-wheeler locks. The two-wheeler locks only have to be formed in a similar manner and in particular have to have a matching cut-out for the support element and a matching shape for the fixing element of the holder in the region of the fixing element.

In some embodiments, the required support in the longitudinal direction may be effected solely by the engagement of a support element in the intermediate space typically present with a folding lock between the lock body and the jointed bar hoop so that, for example, a support of the two-wheeler lock at a lower side may be avoided and the holder thus does not have to be fixed to a single possible length of the two-wheeler lock.

Finally, an at least substantially clearance-free fixing of the two-wheeler lock in the holder is possible by the combination of a support element projecting along a transverse axis with a fixing element effective along the transverse axis since the support element may engage from one side with an exact fit into the cut-out of the two-wheeler lock and the two-wheeler lock may be finally fixed by the fixing element at a side disposed opposite hereto.

In accordance with some embodiments, the support element is at least substantially rigidly connected to the carrier.

The support element may in particular be molded integrally, i.e. with material continuity in one part, to the carrier. Production is simplified by the connection with material continuity since the carrier may be manufactured together with the support element.

In accordance with some other embodiments, the support element has the shape of a support web that extends substantially along the transverse axis and along a direction that extends perpendicular to the longitudinal axis and to the transverse axis. The dimensions of the support web are selected such that they correspond to the clear dimensions of the cut-out of the associated two-wheeler lock. The support web hereby makes possible a suitable suspension of the two-wheeler lock at the carrier.

In accordance with some other embodiments, the support element tapers along the transverse element. A simple suspension of the two-wheeler lock within the cut-out is present by a shape of the support element tapering to a point along the transverse axis. The suspension may also be facilitated by a tapered end of the support element, for example. Furthermore, an at least substantially clearance-free seating of the two-wheeler lock at the support element is hereby made possible since the two-wheeler lock may be placed so far onto the support element until it contacts the environment of the cut-out in a shape-matched manner.

In accordance with some other embodiments, the fixing element is at least substantially aligned along a direction in the closed position that extends within a plane perpendicular to the longitudinal axis of the carrier spaced apart from the carrier and orthogonal to the transverse axis. The direction of extension of the fixing element may thus intersect the longitudinal axis of the carrier at a right angle to block the two-wheeler lock received in the reception region along its periphery against an unintended release from the support element.

In accordance with some other embodiments, the fixing element or a respective section of the fixing element is elastic perpendicular to its direction of extension, but not along its direction of extension. As such, a respective section of the fixing element may be bent in a resilient manner, but cannot be pulled apart elastically along its longitudinal extension. This in particular also applies to a plurality of sections of the fixing element facing in different directions, for example when the fixing element is substantially of U shape, with in this case the U shape overall being able to have a certain longitudinal elasticity (by bending the individual sections relative to one another). Such a restricted elasticity of the fixing element may simplify the handling of the fixing element. In some embodiments, the fixing element does not have to be longitudinally stretched by an undesirably high force effort for the bringing into the closed position. An elasticity of the fixing element in the lateral direction may, however, enable or assist a force-fitting fixing of the two-wheeler lock in the reception region of the carrier.

In accordance with some other embodiments, the fixing element is at least substantially of stable shape. Due to the shape stability of the fixing element, a simplified handling is made possible in comparison with non-shape stable fixing elements (for example a tab manufactured from an elastomer) since the user does not have to apply any additional force (and optionally a counter-force for the support) to adapt the shape of the fixing element to the two-wheeler lock or to stretch the fixing element on the closing of the fixing element.

In some embodiments, a longitudinally elastic tab, for example, that is tensioned over the two-wheeler lock is used instead of a shape stable fixing element.

In accordance with some other embodiments, the fixing element is convexly arched with respect to the reception region for the two-wheeler lock. A pressing force on the two-wheeler lock located in the reception region may be generated or assisted by a convex arching.

In accordance with some other embodiments, the fixing element peripherally surrounds the reception region in the closed position. The peripheral direction of the reception region in this connection in particular relates to the longitudinal axis of the carrier, i.e. the periphery extends at least substantially along an orthogonal plane with respect to the longitudinal axis of the carrier. A securing of the two-wheeler lock against a lateral escape from the reception region is achieved by the reception region closed along the total periphery.

In accordance with some embodiments, the fixing element has a fixing hoop that is supported at the carrier pivotable between the open position and the closed position. The handling of the two-wheeler holder is additionally simplified by the formation of the fixing element to a stable shape, pivotably supported fixing hoop. The fixing hoop may be intuitively guided into the open position and into the closed position by the pivotable support. A particularly simple handling of the holder results when the fixing hoop may be pivoted substantially free of forces, apart from frictional forces, between the open position and the closed position.

In accordance with some embodiments, the fixing hoop is substantially of U shape. The fixing hoop may in particular have a base section that is arranged between two limb sections. A surrounding of the typically parallelepiped-shaped reception region is possible through the U-shaped design of the fixing hoop. The two-wheeler lock may hereby be firmly fixed and secured against a lateral leaving of the reception region.

In accordance with some embodiments, the fixing hoop is pivotably supported at the carrier by at least one hinge. The one-handed use is hereby facilitated by the hinge. A free pivotability of the fixing hoop is in particular possible due to the hinge, with the fixing hoop first being moved substantially force-free in the direction of the closed position and with the user only tensioning the fixing hoop against the two-wheeler lock on the final closing. An intuitive handling of the holder is effected by the hinge since the direction of movement of the fixing hoop is hereby predefined for the user.

In accordance with some embodiments, the respective hinge has a cylindrical hinge pin of the fixing hoop or of the carrier that is engaged around, in particular partially peripherally, by a hinge bracket of the carrier or of the fixing hoop. The movement of the fixing hoop into the open position or closed position is made possible by the cylindrical hinge pin. In contrast to, for example, a tab molded on with material continuity or to a ball joint, fewer degrees of freedom in the movement of the fixing hoop is achieved by the cylindrical hinge pin. Only a single pivot axis for the movement of the fixing hoop hereby results, from which a simple, intuitive and low-wear handling is made possible with few canting possibilities of the fixing hoop.

In accordance with some embodiments, the fixing hoop is pivotable about a pivot axis that extends in parallel with the longitudinal axis of the carrier. The fixing hoop may thus surround the reception region in the closed position in parallel with the plane of extension of a front side of the carrier.

In accordance with some embodiments, the fixing hoop is supported at the carrier pivotable by two hinges that are arranged in alignment with one another and that are spaced apart from one another along the longitudinal axis of the carrier. The guidance of the fixing hoop becomes more stable by the movement of the fixing hoop via two hinges. The fixing hoop may in particular have a substantially X shape: in this respect, the two hinges form the ends of the X shape at a side of the carrier.

In accordance with some embodiments, the fixing hoop has a free end that is latchable to the carrier by a latch device. A simple and in particular one-handed opening and closing of the fixing hoop is possible by the provision of the latch device. The fixing hoop is fixedly blocked at the carrier in its closed position by the latch device and the two-wheeler lock is hereby securely fixed in the reception region of the holder.

In accordance with some other embodiments, the fixing hoop extends along the longitudinal axis of the carrier over at least half the length of the carrier and the latch extends along the longitudinal axis of the carrier over at least one third of the extent of the fixing hoop. A particularly stable latch connection may be achieved by such a relatively long latch device (e.g. with a latch web and a latch nose) with respect to the total length of the carrier of at least one third of the carrier. The fixing of the two-wheeler lock in the reception region of the holder is hereby improved, which is particular useful with relatively heavy and/or elongated two-wheeler locks.

In accordance with some other embodiments, the carrier and/or the fixing hoop has a respective guide web at both sides of the latch device with respect to the longitudinal axis of the carrier, with the guide web bounding a movement of the latched end of the fixing hoop relative to the carrier along the longitudinal axis. The stability of the latch connection is improved by such guide webs at the two ends of the latch device since the guide webs prevent a mutual shifting of the latch elements (e.g. latch web and latch nose) at both sides, for example on a twisting of the holder, such as may occur due to vibrations during the trip with a heavy two-wheeler lock. The respective guide web may also effect or contribute to the closed fixing hoop not being opened by accident, e.g. during the trip with the two-wheeler by the leg or the foot of the user. For this purpose, the respective guide web may cover the free end of the fixing hoop and/or a handle located there at least partly (in alignment, i.e. viewed in parallel, with the longitudinal axis of the carrier).

In accordance some other embodiments, the free end of the fixing hoop has a handle in the region of the latch device for gripping the free end of the fixing hoop, with the handle being oriented in the direction of the carrier. In other words, the fixing hoop has a handle for gripping and actuating (in particular opening) the fixing hoop, with the handle, however, (viewed from the front side or along the transverse axis) substantially not projecting laterally, apart from a thickened design, over the fixing hoop, but rather being angled (for example at a right angle) in the direction of the carrier of the holder. The handle is thus angled in the direction of the frame tube of the two-wheeler to which the holder is fastened. The handle may be formed as a gripping web. A simple and in particular one-handed opening and closing of the fixing hoop is made possible with the aid of the handle. The user may overcome the latch connection of the latch device and may release the free end of the fixing hoop from the carrier by a pulling at the handle. Since the handle at least substantially faces in the direction of the carrier of the holder or in the direction of the associated frame tube, the fixing hoop cannot be accidentally opened by the leg or foot of the user during the trip.

In accordance some embodiments, the movable fixing element (in particular the fixing hoop) has at least one spring section that is configured to exert a pressing force on the two-wheeler lock in the closed position of the fixing element. The closed position of the fixing element is made possible by the spring section using a pressing force that is effective between the fixing element and the two-wheeler lock located in the reception region of the holder. This pressing force and in particular also the counter-force (reaction force) generated between the two-wheeler lock and the carrier as well as the friction forces hereby effective in the lateral direction improve the fixing of the two-wheeler lock in the reception region. Any possible clearance with locks not exactly fitting in the reception region of the holder may also be eliminated by formation of a spring section. Unwanted rattling noises may hereby in particular also be suppressed that could otherwise occur during the trip with the two-wheeler due to the vibrations that occur in this respect.

In accordance some embodiments, the spring section is resilient, in particular in a direction that extends transversely (and in some embodiments, perpendicular) to the direction of extension of the spring section. On an elastic deformation of the spring section, a return force may thus be caused to generate the explained pressing force on the two-wheeler lock.

The fixing element itself or a part of the fixing element (in particular the base section of the fixing hoop) may in particular form the spring section, with the fixing element or the part of the fixing element forming the spring section being resilient.

In accordance with some embodiments, the spring section is aligned obliquely with respect to the direction of extension of the fixing element. The spring section may hereby project over the plane of extension of the fixing element in the environment of the spring section, in particular in the direction of the reception region for the two-wheeler lock (with respect to the closed position of the fixing element). The orientation of the spring section with respect to the direction of extension of the fixing element may be defined by an acute angle in some embodiments. A clearance-free fixing of a two-wheeler lock in the reception region of the holder is improved by an oblique orientation of the spring section relative to the fixing element (at least in the environment of the spring section) due to the pressing force thereby increased.

In some other embodiments, the spring section may in particular be inclined in the direction of the reception region for the two-wheeler lock with respect to the direction of extension of the fixing element. The creation of the pressing force on the two-wheeler lock is assisted by the inclination of the spring section in the direction of the reception region.

In accordance with some embodiments, the fixing element has two spring sections that face in mutually at least substantially opposite directions, apart from a slanted position in the direction of the receiving region for the two-wheeler lock. Due to the different directions of the spring sections, a mutual impairment of the pressing forces by the spring sections is suppressed and the spring sections may additionally engage at different points of the two-wheeler lock. An even more reliable fixing of the two-wheeler lock located in the reception region may be achieved by the use of two spring sections.

In accordance with some embodiments, the spring section (or the plurality of spring sections) is/are formed integrally at the fixing element. The spring section may hereby be manufactured in a particularly simple manner since no separate production or fastening of the spring section is necessary. Furthermore a possible wear by friction of individual components in the spring section is hereby countered. In addition, a constant, resilient effect of the spring section is made possible since no fasteners (for example screws, spring elements) may be loosened or released.

In some embodiments, the respective spring section may be formed by a multi-part clearance at the fixing element. The spring section may be deformed for adaptation to the geometry of the two-wheeler lock by a partial peripheral clearance of the spring section.

In accordance with some embodiments, the respective spring section is formed in tongue shape. A reliable fixing of the received two-wheeler lock with simultaneously small deformation and small wear is achieved by such a shape of the spring section. In addition, the shape, which is simple in comparison with a complex shape, facilitates the manufacture of the spring section and thus of the total fixing element.

In accordance with some embodiments, at least one lateral stabilization element is furthermore provided at the carrier and supports the two-wheeler lock received in the reception region in the open position of the fixing element (and also in the closed position) against a movement along a lateral direction that extends perpendicular to the longitudinal axis of the carrier and the transverse axis. Such a lateral stabilization element may facilitate the correct insertion of the two-wheeler lock into the reception region. Furthermore, such a lateral stabilization element may support the two-wheeler lock, that typically has an elongate shape and may thus exert relatively high torques on the support element and on the fixing element on lateral vibrations, in the lateral direction without impairing the aspects of the holder (simple handling of the holder or insertion of the two-wheeler lock, universal usability for different lengths of two-wheeler locks). At least two lateral stabilization elements are provided at the carrier, namely at both sides of the reception region for the two-wheeler lock with respect to the lateral direction. The respective lateral stabilization element may be formed, for example, in the form of a lateral web at the carrier. The respective lateral stabilization element does not, however, have to be configured in the manner of a housing wall; a relatively small height (along the transverse axis) is already sufficient that amounts, for example, to approximately one third or one quarter of the clearance of the reception region along the transverse axis (in the closed position of the fixing element). The respective lateral stabilization element also does not have to extend over the total length of the reception region along the longitudinal axis of the carrier; the respective lateral stabilization element extending over a part of the length of the reception region is sufficient.

In accordance with some embodiments, the carrier is configured in the manner of an elongate plate that extends along the longitudinal axis.

In accordance with some other embodiments, the carrier may have a contact plate at its rear side that may in particular be releasably fastened to the carrier. It is possible by such a releasable fastening first to fasten the contact plate to the tube section and subsequently to mount the carrier to the contact plate.

In some embodiments, the carrier may have a contact plate at its rear side that comprises a softer material than the carrier. An improved contact of the carrier at the tube section of the two-wheeler may hereby be achieved, with the contact plate in particular being able to have a coefficient of friction increased (relative to the carrier) an/or being able to effect a damping. The contact plate may, as explained above, be releasably fastened to the carrier or may be formed integrally with the carrier (for example as a so-called 2K injection molded part).

The carrier or the contact plate may have a concave cross-section at the rear side to achieve an improved shape matching with the tube section of the two-wheeler.

The carrier may, for example, have a plurality of fastening openings distributed along the longitudinal axis of the carrier for leading through fasteners, such as screws, and/or may have lateral slits for leading through a fastening band (e.g. using a hook and loop fastener element).

In some embodiments, the holder may generally be produced from a wear-resistant polymer.

In some other embodiments, the present disclosure relates to a lock arrangement having a holder in accordance with one of the aforesaid embodiments and having a two-wheeler lock of the type of a folding lock, with the two-wheeler lock having a lock body and a jointed bar hoop which is fastened thereto and which has a plurality of jointed bars which are pivotable with one another and which may be folded together to form an axially parallel arrangement, with the cut-out of the two-wheeler lock being formed between the lock body and the jointed bar hoop.

In some other embodiments, the present disclosure relates to a lock system having a holder in accordance with one of the aforesaid embodiments and having at least two different two-wheeler locks of the type of a folding lock, with the respective two-wheeler lock having a lock body and a jointed bar hoop that is fastened thereto and that has a plurality of jointed bars pivotably connected to one another that may be folded together to form an axially parallel arrangement, with the cut-out of the respective two-wheeler lock being formed between the lock body and the jointed bar hoop, and with the at least two different two-wheeler locks differing from one another with respect to their lengths and in particular with respect to the lengths of their respective jointed bar hoops. A single holder may hereby selectively be universally used for a system of a plurality of folding locks of different lengths (e.g. two, three, or even more different folding locks).

BRIEF DESCRIPTION OF THE DRAWINGS

The present disclosure will be explained in the following only by way of example with reference to the drawings. Elements which are the same or of the same kind are marked by the same reference numerals therein.

DETAILED DESCRIPTION

FIGS. 1 to 5 show different views of a holder for a two-wheeler lock 11 (FIG. 5) of a folding lock type. Such a folding lock typically comprises a lock body 15 and a jointed bar hoop 17 that is fastened thereto and that has a plurality of jointed hoops that are pivotably connected to one another and that may be folded together to form a compact package. Substantially parallelepiped-shaped dimensions with two narrow sides and two broad sides along the periphery hereby result for the two-wheeler lock 11 and in particular for the jointed bar hoop 17. The folded together two-wheeler lock 11 furthermore forms a continuous cut-out 13 in the upper region of the two broad sides between the lock body 15 and the jointed bar hoop 17.

Figure 4:
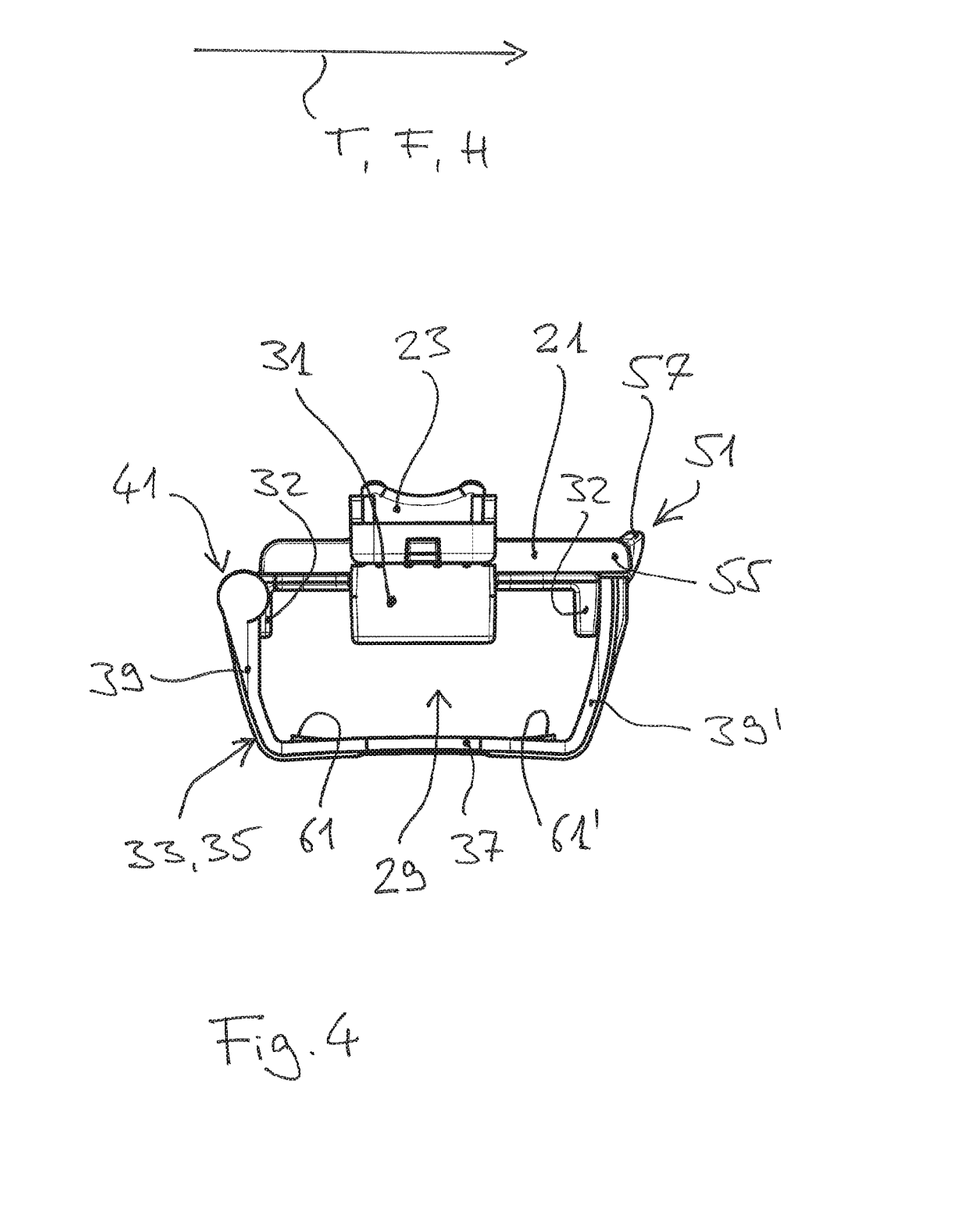
FIG. 4 shows a plan view of the holder with the fixing hoop in the closed position.

The holder for the two-wheeler lock 11 comprises a carrier 21 that serves as a base plate, that extends along a longitudinal axis L, and that has a contact plate 23 concavely arched in cross-section at its rear side (see FIG. 4). The contact plate 23 is releasably fastened to the lower side of the carrier 21. The carrier 21 may be fastened to a tube section R of a two-wheeler (FIG. 2) with the aid of a plurality of fastening openings 25 and lateral slits 27. Fasteners 26, such as screws, may be led through the fastening openings 25 and may be fastened to the tube section R. The carrier 21 may be fastened by a fastener in the form of a fastening band in that the band is led through the lateral slits 27. The contact plate 23 may moreover comprise a softer material, with respect to the carrier 21, to enable an optimum adaptation of the contact plate 23 to the tube section R.

The holder forms a reception region 29 in which the two-wheeler lock 11 is located in use. The reception region 29 is here aligned in parallel with the longitudinal axis L of the carrier 21. On a reception of a two-wheeler lock 11 in the reception region 29, a broad side of the two-wheeler lock 11 contacts the front side of the carrier 21 shown in FIGS. 2 and 5.

Figure 1:
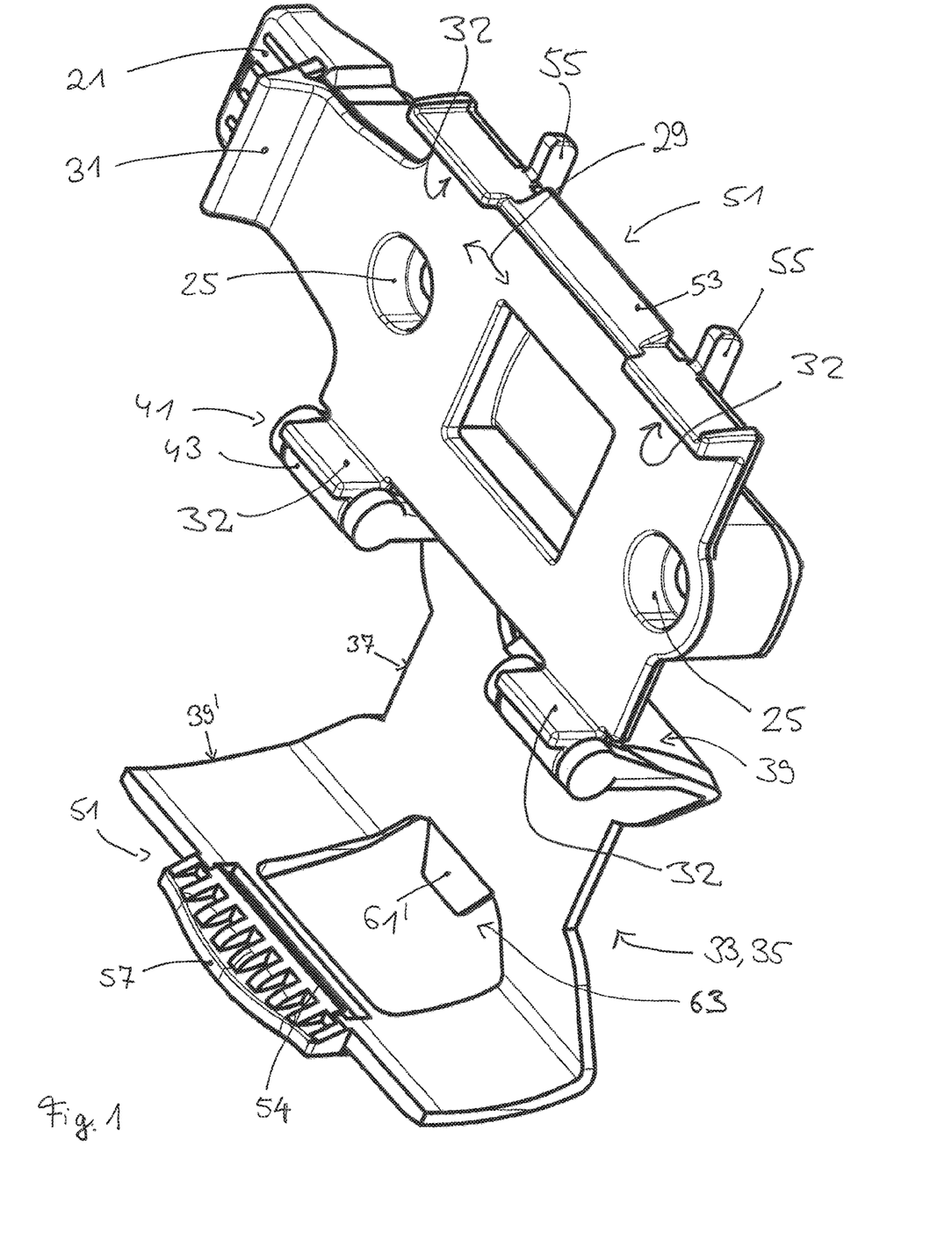
FIG. 1 shows a perspective view of a holder for a two-wheeler lock with a fixing element in the closed position obliquely from the front.
Figure 2:
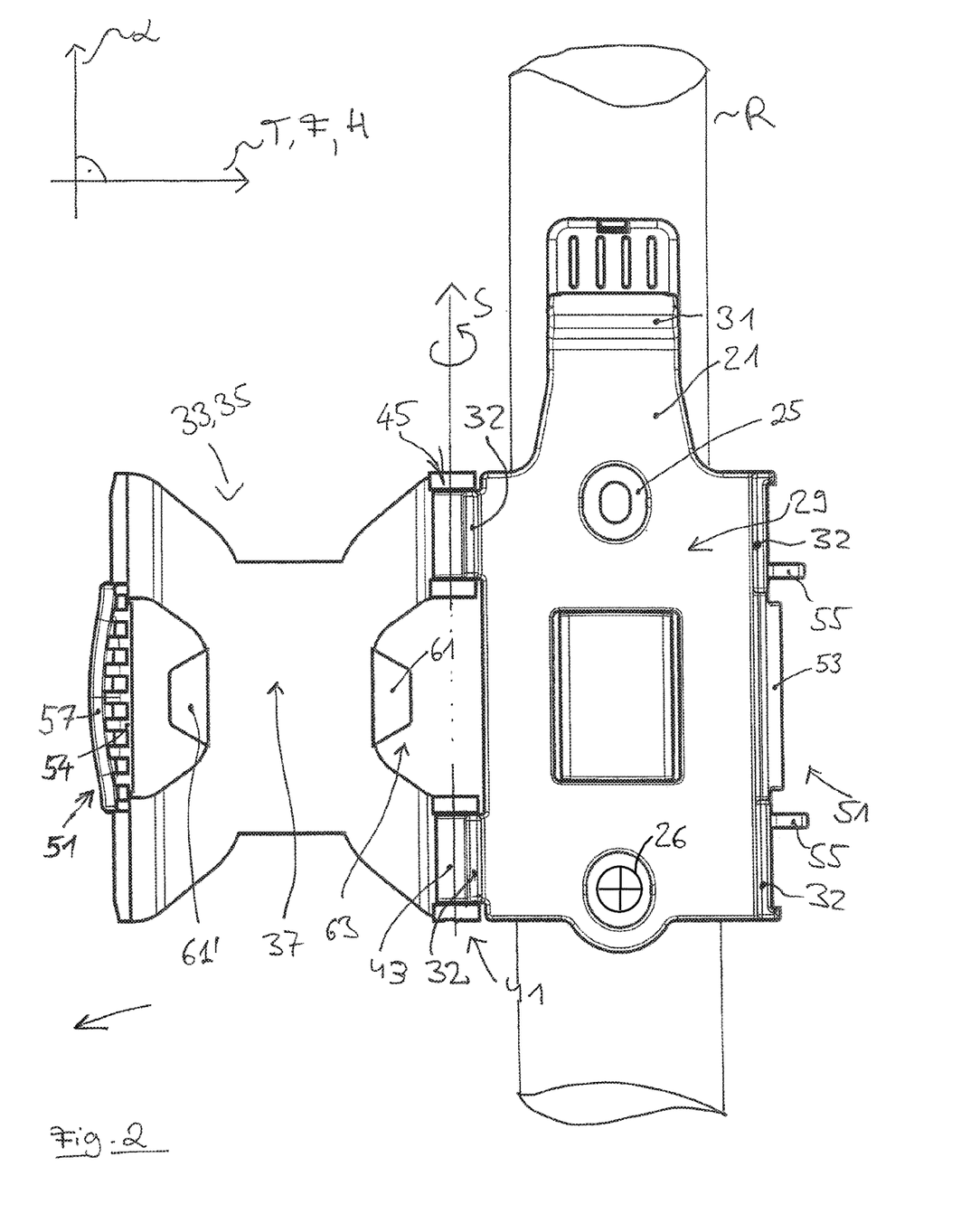
FIG. 2 shows a front view of the holder with the fixing hoop in the open position.
Figure 3:
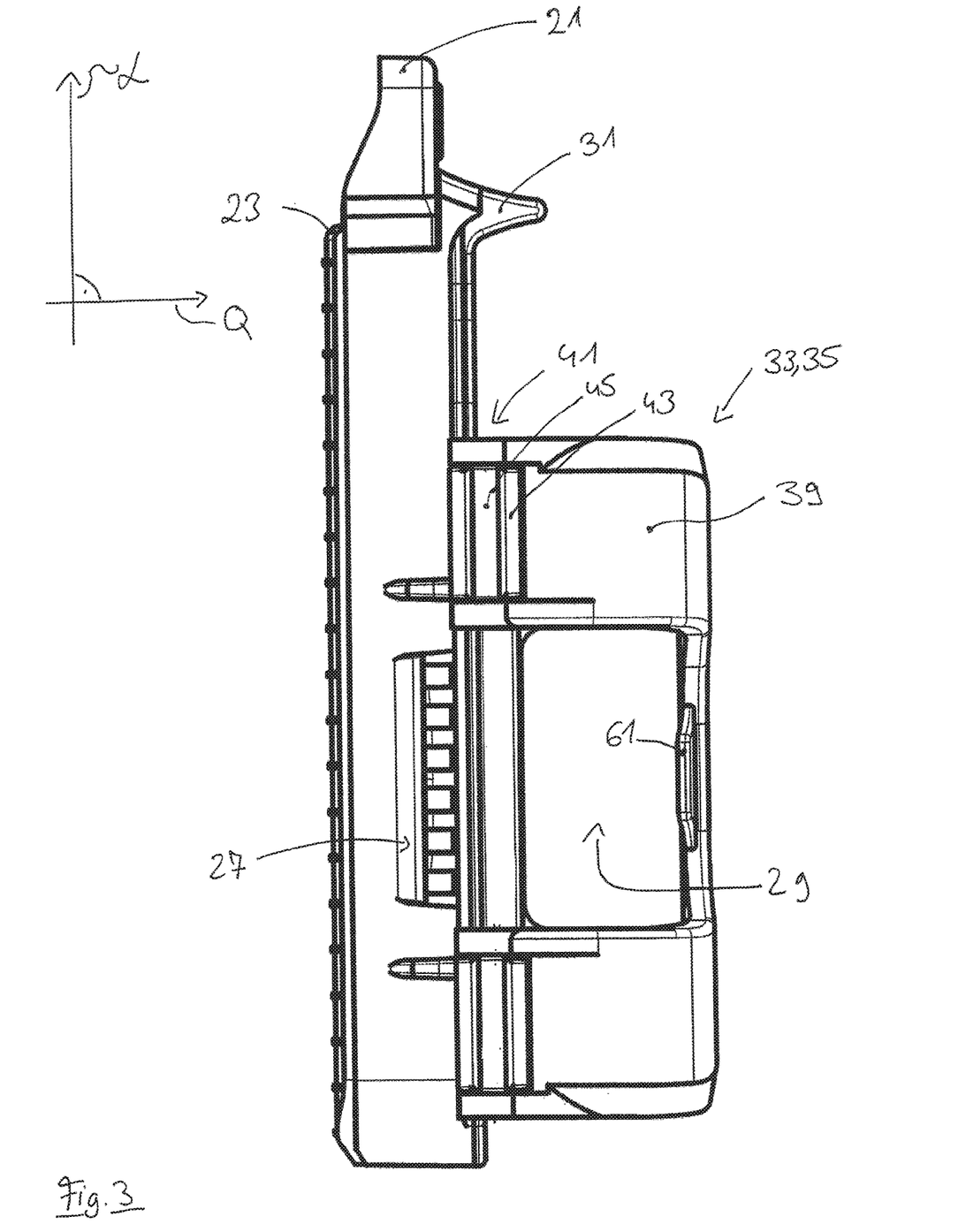
FIG. 3 shows a side view from the left of the holder with the fixing hoop in the closed position.

A support element 31 projects at the upper end of the carrier 21. The support element 31 is formed at least substantially rigidly, in particular integrally, at the carrier 21. The support element 31 forms a projection of the carrier 21 and is configured to engage into the cut-out 13 of the two-wheeler lock 11 so that the two-wheeler lock 11 may be suspended at the support element 31 and the two-wheeler lock 11 is thus fixed with respect to the longitudinal axis L of the carrier 21 in the reception region 29 of the carrier 21. The support element 31 has the shape of a support web. The support element 31 extends at least substantially along a transverse axis Q that extends transversely (perpendicular in the embodiment shown) to the longitudinal direction L (FIG. 3). The support element 31 or the support web furthermore extends along a direction T that extends perpendicular to the longitudinal axis L and to the transverse direction Q (FIG. 2). The support element 31 tapers along the transverse element Q so that the support element 31 may be more easily introduced into the cut-out 13 of the two-wheeler lock 11.

A plurality of lateral stabilization elements in the form of lateral webs 32 are furthermore formed at the carrier 21 in the lateral environment of the reception region 29. The lateral webs 32 are formed at least substantially rigidly, in particular integrally, at the carrier 21. The lateral webs 32 effect a support of the two-wheeler lock 11 received in the reception region 29 against a movement along a lateral direction H that extends perpendicular to the longitudinal axis L of the carrier 21 and the transverse axis Q.

To fix the two-wheeler lock 11 suspended at the support element 31 in the reception region 29, a fixing element 33 is movable fastened to a side of the carrier 21. The fixing element 33 is in this respect at least substantially aligned along a direction F that extends perpendicular to the longitudinal axis L of the carrier 21 and perpendicular to the transverse axis Q of the support element 31 (FIG. 2). The direction F thus extends in parallel with the direction of extension T of the support element 31 or of the support web. The fixing element 33 is elastic perpendicular to its direction of extension F, but not along its direction of extension F. Due to these elasticity properties, individual sections of the fixing element 33 may be bent, but cannot be drawn in length. The handling of the fixing element 33 in general and a force-transmitting fixing of the fixing element 33 in particular may be simplified by this restriction in the elasticity of the fixing element 33.

Figure 5:
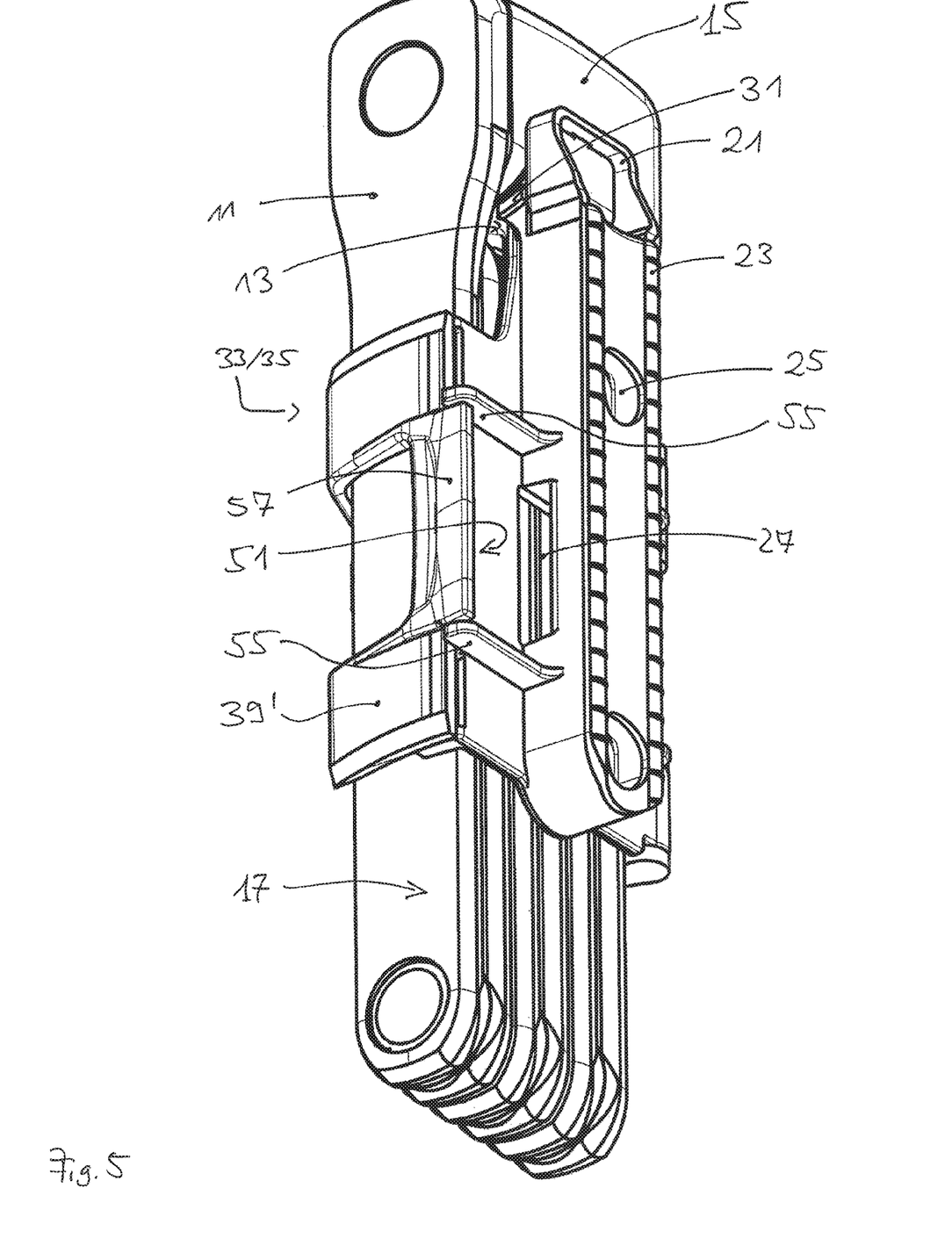
FIG. 5 shows a perspective view of the holder with a two-wheeler lock received therein obliquely from the rear, with the fixing hoop being in the closed position.

The fixing element 33 in the embodiment shown here is configured as a fixing hoop 35 that is supported at the carrier 21 freely pivotable between an open position (FIGS. 1 and 2) and a closed position (FIGS. 3 to 5). The fixing hoop 35 is formed substantially in U shape and has a base section 37 that is convexly arched with respect to the reception region 29 and that is arranged between two limbs 39, 39'. The U shape of the fixing hoop 35 is elastic overall due to the above-named elasticity properties. In the closed state, the U-shaped fixing hoop 35 surrounds the reception region 29 with respect to the longitudinal axis L in the periphery from three sides; the fourth side is covered by the carrier 21 itself. A pressing force is exerted onto the two-wheeler lock 11 in the direction of the carrier 21 located in the reception region 29 in the closed position due to the additional convex arching of the fixing hoop 35 so that the two-wheeler lock 11 is fixed in position by force transmission in the reception region 29. The explained tapering longitudinal sectional shape of the support element 31 furthermore has the effect that on an exertion of force on the two-wheeler lock 11 suspended at the support element 31, the two-wheeler lock comes to lie at the support element 31. The fixing hoop 35 is formed as substantially shape stable; the handling is hereby additionally facilitated.

The fixing hoop 35 may be pivoted into the closed position or open position by the user substantially free of force and in an intuitively easily understandable manner. As may be seen in FIGS. 1 and 2, the fixing hoop 35 is fastened to the carrier 21 by two hinges 41. The respective hinge 41 comprises a hinge bracket 43 of the carrier 21 that partially peripherally engages around a hinge pin 45 of the fixing hoop 35. The fixing hoop 35 is pivotable by the hinges 41 about a pivot axis S in parallel with the longitudinal axis L (see FIG. 2).

In the embodiment shown here, the fixing hoop 35 is substantially of X shape, with the two limbs 39, 39' accordingly having a central cut-out. The fixing hoop 35 is furthermore here fixed to the carrier 21 freely pivotable by two hinges 41. The two hinges 41 are here arranged in alignment with one another and are spaced apart from one another along the longitudinal axis of the carrier 21.

To block the fixing hoop 35 in the closed position (FIGS. 3 to 5), the fixing hoop 35 has a latch device 51 at its free end. The latch device 51 comprises a latch web 53 of the carrier 21 and a latch nose 54 of the fixing hoop 35 that is latchable to the latch web 53. The carrier 21 furthermore comprises a respective guide web 55 at both sides of the latch web 53. The guide webs 55 bound a movement of the latched end of the fixing hoop 35 or of the latch nose 54 relative to the carrier 21 along the longitudinal axis L, whereby the stability of the latch connection is improved.

The X-shaped fixing hoop 35, including the hinges 41 and the latch device 51, extends along the longitudinal axis L of the carrier 21 over more than half the length of the carrier 21. The latch device 51 in turn extends along the longitudinal axis L over approximately half the extent of the fixing hoop 35. A particularly high stability of the latch connection hereby results in the closed position of the fixing hoop 35.

The fixing hoop 35 has a handle 57 at the level of the latch nose 54 to grip the free end of the fixing hoop 35. The opening of the fixing hoop 35 or the release of the latch connection is facilitated by the handle 57. The handle 57 is formed by an extension of the limb 39' of the U-shaped fixing hoop 35 that is aligned in the direction of the carrier 21 in the closed direction of the carrier 21 (FIGS. 3 to 5).

As may be seen particularly easily from the plan view in accordance with FIG. 4, the guide webs 55 also prevent an accidental opening of the fixing hoop 35 in that the guide webs 55 partly cover the limb 39' and the handle 57 provided there, viewed along the longitudinal axis L.

The fixing hoop 35 has two resilient spring sections 61, 61' in the embodiment shown here. The spring sections 61, 61' are integrally formed at the base section 37 of the fixing hoop 35 by a respective multilateral clearance 63 and are inclined slightly obliquely with respect to the direction of extension of the base section 37. The tongue-shaped spring sections 61, 61' hereby face in the direction of the reception region 29 in the closed position of the fixing hoop 35. In another respect, the two spring sections 61, 61' face in mutually opposite directions. A pressing force is exerted onto the two-wheeler lock 11 by the respective spring section 61, 61' in the closed position of the fixing hoop 35, with a return force being caused due to the resilient formation of the spring sections 61, 61' on their deformation. A counter-force is also generated between the carrier 21 and the two-wheeler lock 11 by the exertion of the pressing force. This pressing force or counter-force improves the fixing of the two-wheeler lock even more.

As regards the user of the holder shown in FIGS. 1 to 5, the two-wheeler lock 11 (FIG. 5) may be suspended in a simple manner at the support element 31 in an open position of the fixing hoop 35 (FIGS. 1 and 2), wherein the support element 31 is introduced along the transverse axis Q into the cut-out 13 of the two-wheeler lock 11. Since the support element 31 projects from the freely accessible front side of the carrier 21, the two-wheeler lock 11 may be placed at least substantially frontally onto the carrier 21 without the suspension of the two-wheeler lock 11 at the support element 31 being impeded by frame sections of the two-wheeler in the surroundings of the holder. The fixing hoop 35 may be brought into the closed position by a subsequent pivoting of the fixing hoop 35 about the pivot axis S to secure the two-wheeler lock 11 against an unintentional release from the support element 31 along the transverse axis Q. This pivot movement is made possible by the hinges 41. On completion of the pivot movement, a secure latch connection is achieved by the latch device 51 that blocks the fixing hoop 35 in the closed position. The two-wheeler lock 11 is thus peripherally fixed in the reception region 29 of the holder and is fixed overall with respect to the longitudinal axis L of the carrier 21 and in the lateral direction, in particular along the transverse axis Q (see FIG. 5). A simple handling of the holder results overall, with a one-handed operation also being possible.

In some embodiments, the holder comprises the reception of different two-wheeler locks 11 having different lengths. Since the support element 31 is the only element that holds the two-wheeler lock in the open position of the fixing hoop 35 in the reception region 29, there is no further downward or upward bounding of the reception region 29 along the longitudinal axis L. Two-wheeler locks 11 of different lengths may thus be suspended and may subsequently be fixed by closing the fixing hoop 35.

It is possible in a further embodiment, not shown, that the fixing element 33 has, instead of the fixing hoop 35, a longitudinally elastic tab that is tensioned over the two-wheeler lock 11 located in the reception region 29.

In yet a further embodiment, not shown, it is possible that only a single spring section 61 is provided at the fixing element 33 and/or that the spring section or sections is/are aligned at least substantially in parallel with the longitudinal axis L of the carrier 21, apart from a certain slanted position in the direction of the reception region 29, and extends/extend over some (in particular more than half) of the width or almost the total width of the fixing element 33. The respective spring section may hereby contact a plurality or even all of the jointed bars of the two-wheeler lock 11 to fix the two-wheeler lock 11 in the reception region 29 and in particular also to prevent a rattling movement of the individual jointed bars relative to one another.

The invention claimed is:

1. A holder for a two-wheeler lock of a folding lock type, the holder comprising;
    a carrier that extends along a longitudinal axis, the carrier bounds a reception region that is configured to receive the two-wheeler lock, and
    a fixing element supported at the carrier and movable between an open position and a closed position that is configured to fix the two-wheeler lock in the reception region,
    wherein a support element is provided at the carrier and that is configured to support the two-wheeler lock configured to be received in the reception region against a movement along the longitudinal axis of the carrier,
    wherein the support element projects from the carrier along a transverse axis aligned transversely to the longitudinal axis and is configured to engage into a cut-out of the two-wheeler lock, with the support element being the only element of the holder configured to support the two-wheeler lock received in the reception region against a movement along the longitudinal axis of the carrier in the open position of the fixing element, and with the fixing element being configured to block the two-wheeler lock against a removal from the support element along the transverse axis in the closed position.

2. The holder in accordance with claim 1, wherein the support element is at least substantially rigidly connected to the carrier.

3. The holder in accordance with claim 1, wherein the support element is formed integrally at the carrier.

4. The holder in accordance with claim 1, wherein the support element has a shape of a support web that extends at least substantially along the transverse axis and along a direction that extends perpendicular to the longitudinal axis and to the transverse axis.

5. The holder in accordance with claim 1, wherein the support element tapers along the transverse axis.

6. The holder in accordance with claim 1, wherein the fixing element is at least one of:
    being elastic perpendicular to its respective direction of extension, but not along its respective direction of extension; or
    being at least substantially stable in shape.

7. The holder in accordance with claim 1, wherein the fixing element is at least one of:
    being convexly arched with respect to the reception region; or
    peripherally closing the reception region in the closed position.

8. The holder in accordance with claim 1, wherein the fixing element has a fixing hoop that is supported at the carrier pivotable between the open position and the closed position.

9. The holder in accordance with claim 8, wherein the fixing hoop is at least one of:
    being substantially of U shape; or
    having a base section that is arranged between two limb sections.

10. The holder in accordance with claim 8, wherein the fixing hoop is at least one of:
    being supported at the carrier pivotable by at least one hinge; or
    being pivotable about a pivot axis that extends in parallel with the longitudinal axis of the carrier.

11. The holder in accordance with claim 8, wherein the fixing hoop is supported at the carrier pivotable by two hinges that are arranged in alignment with one another and are spaced apart from one another along the longitudinal axis of the carrier.

12. The holder in accordance with claim 8, wherein the fixing hoop has a free end that is latchable to the carrier by a latch device.

13. The holder in accordance with claim 12, wherein the fixing hoop extends along the longitudinal axis of the carrier over at least half the length of the carrier; and
    wherein the latch device extends along the longitudinal axis of the carrier over at least one third of the extent of the fixing hoop.

14. The holder in accordance with claim 12, wherein at least one of the carrier and the fixing hoop has a respective guide web at both sides of the latch device with respect to the longitudinal axis, the guide web bounding a movement of a latched end of the fixing hoop relative to the carrier along the longitudinal axis.

15. The holder in accordance with claim 12, wherein the free end of the fixing hoop has a handle in a region of the latch device for gripping the free end of the fixing hoop, with the handle being aligned in a direction of the carrier.

16. The holder in accordance with claim 1, wherein the fixing element has at least one spring section that is configured to exert a pressing force onto the two-wheeler lock in the closed position of the fixing element.

17. The holder in accordance with claim 16, wherein the spring section is at least one of:
    being aligned obliquely with respect to a direction of extension of the fixing element; or
    being inclined with respect to the direction of extension of the fixing element in the direction of the reception region; or
    having two spring sections that face at least in substantially opposite directions with respect to one another; or
    being formed integrally at the fixing element; or
    being formed by a multilateral clearance at the fixing element; or
    being of tongue shape.

18. The holder in accordance with claim 1, wherein at least one lateral stabilization element is provided at the carrier that is configured to support the two-wheeler lock that is configured to be received in the reception region in the open position of the fixing element against a movement along a lateral direction that extends perpendicular to the longitudinal axis of the carrier and of the transverse axis.

19. The holder in accordance with claim 1 further comprising the two-wheeler lock.

20. A lock arrangement comprising:

a two-wheeler lock of a folding lock type, the two-wheeler lock having a lock body and a jointed bar hoop which is fastened thereto, a plurality of jointed bars which are pivotably connected to one another and that are folded together to form an axially parallel arrangement, and a cut-out that is formed between the lock body and the jointed bar hoop; and a holder configured to hold the two-wheeler lock, the holder includes a carrier, a fixing element, and a support element, the carrier extends along a longitudinal axis, the carrier bounds a reception region that receives the two-wheeler lock, the fixing element is supported at the carrier and movable between an open position and a closed position that fixes the two-wheeler lock in the reception region, the support element is provided at the carrier and supports the two-wheeler lock received in the reception region against a movement along the longitudinal axis of the carrier, wherein the support element projects from the carrier along a transverse axis aligned transversely to the longitudinal axis and is configured to engage into the cut-out of the two-wheeler lock, with the support element being the only element of the holder that supports the two-wheeler lock received in the reception region against a movement along the longitudinal axis of the carrier in the open position of the fixing element, and with the fixing element being configured to block the two-wheeler lock against a removal from the support element along the transverse axis in the closed position.

21. A lock system comprising:

at least two different two-wheeler locks of a folding lock type, the at least two different two-wheeler locks differing from one another with respect to their lengths, each of the respective at least two different two-wheeler locks having a lock body and a jointed bar hoop that is fastened thereto, a plurality of jointed bars that are pivotably connected to one another and that are folded together to form an axially parallel arrangement, and a cut-out being formed between the lock body and the jointed bar hoop; and a holder configured to hold each of the respective at least two different two-wheeler locks, the holder includes a carrier, a fixing element, and a support element, the carrier extends along a longitudinal axis, the carrier bounds a reception region that receives the respective at least two different two-wheeler locks, the fixing element is supported at the carrier and movable between an open position and a closed position that fixes the respective at least two different two-wheeler locks in the reception region, the support element is provided at the carrier and supports the respective at least two different two-wheeler locks received in the reception region against a movement along the longitudinal axis of the carrier, wherein the support element projects from the carrier along a transverse axis aligned transversely to the longitudinal axis and is configured to engage into the cut-out of the respective at least two different two-wheeler locks, with the support element being the only element of the holder that supports the respective at least two different two-wheeler locks received in the reception region against a movement along the longitudinal axis of the carrier in the open position of the fixing element, and with the fixing element being configured to block the respective at least two different two-wheeler locks against a removal from the support element along the transverse axis in the closed position.

* * * * *